United States Patent [19]

White et al.

[11] 4,272,967
[45] Jun. 16, 1981

[54] SELF-CONTAINED PORTABLE AIR-CONDITIONING SYSTEM

[75] Inventors: Jack H. White, Fountain Valley; Joseph M. FitzGerald, Buena Park, both of Calif.

[73] Assignee: Lear Siegler, Inc., Santa Ana, Calif.

[21] Appl. No.: 135,746

[22] Filed: Mar. 31, 1980

Related U.S. Application Data

[63] Continuation of Ser. No. 918,016, Jun. 22, 1978, abandoned.

[51] Int. Cl.$^3$ .......................... F25B 27/00; B60H 3/04
[52] U.S. Cl. .......................................... 62/236; 62/239
[58] Field of Search ................. 62/236, 237, 239, 243, 62/134; 98/50

[56] References Cited

U.S. PATENT DOCUMENTS

| | | | |
|---|---|---|---|
| 2,513,679 | 7/1950 | Ritter | 62/239 X |
| 2,881,600 | 4/1959 | Elfving | 62/239 |
| 3,320,765 | 5/1967 | Chapple et al. | 62/239 |
| 3,777,506 | 12/1973 | Hergatt et al. | 62/237 |
| 3,859,816 | 1/1975 | McDonald et al. | 62/239 |
| 3,984,224 | 10/1976 | Dawkins | 62/236 |
| 4,051,691 | 10/1977 | Dawkins | 62/236 |

*Primary Examiner*—Lloyd L. King

*Attorney, Agent, or Firm*—Reising, Ethington, Barnard, Perry & Brooks

[57] ABSTRACT

A self-contained, self-propelled air-conditioning system is provided for supplying air to structures, such as aircraft on the ground at airports. The aircraft are of the type having an inlet duct for conveying the air through the structure. The system includes a suitable truck having a frame or chassis mounted on wheels. The system also includes a diesel engine separate from the engine of the truck mounted on the chassis for supplying mechanical energy and an electrical generator mechanically connected to the diesel engine for changing the mechanical energy into electrical energy. A ventilation system is mounted on the frame and is electrically connected to the generator for moving air from the ambience to the inlet duct. A pair of independent refrigeration systems, each including a compressor, are mounted on the frame. The compressors are electrically connected to the generator. Each refrigeration system cools the moving air independently from the other refrigeration system. The air-conditioning system further includes an electrical control system including a plug adapted for connection with an external power supply. The plug allows the air-conditioning system to be electrically connected to the external power supply.

3 Claims, 6 Drawing Figures

SELF-CONTAINED PORTABLE AIR-CONDITIONING SYSTEM

This is a continuation, of application Ser. No. 918,016, filed June 22, 1978, now abandoned.

TECHNICAL FIELD

This invention relates to air-conditioning systems and in particular to self-contained, portable air-conditioning systems.

BACKGROUND ART

It is oftentimes necessary to supply heated or cooled air to aircraft on the ground at airports or other equipment having their own air-conditioning systems but which systems are costly and inconvenient to operate while the plane is on the ground. For example, not only is air-craft fuel more expensive than, for example, gasoline or diesel fuel, but also, if the plane's air-conditioning system is used, fuel must be added just prior to take-off of the plane to compensate for the fuel burned in order to run the plane's air-conditioning system.

Typical air-conditioning units or systems include a diesel engine arranged to drive a compressor unit of the air-conditioning system through a mechanical coupling or clutch interposed between the diesel engine and the compressor. Associated equipment needed in such air-conditioning systems are driven mechanically by belts, couplings and the like. Such mechanically driven compressors have crankshaft seals which have a tendency to prematurely fail, thereby releasing large amounts of fluorocarbons to the atmosphere.

DISCLOSURE OF THE INVENTION

An object of the present invention is to provide a self-contained portable air-conditioning system for providing air to a structure having an inlet duct for conveying the air through the structure wherein the system comprises a prime mover mounted on a frame for supplying mechanical energy and a generator mechanically connected to the prime mover for changing the supplied mechanical energy for energizing the air-conditioning system and other equipment exterior to the air-conditioning system.

Another object of this invention is to provide a self-contained, self-propelled air-conditioning system for providing air to a structure having an inlet duct for conveying the air through the structure wherein a pair of independent refrigeration systems are mounted on a frame and are electrically connected to a generator powered by a prime mover for cooling air moved by a ventilation system from the ambience to the inlet duct and wherein each refrigeration system operates as a backup for the other refrigeration system.

A further object of the invention is to provide a self-contained, self-propelled air-conditioning system for providing air to a structure having an inlet duct for conveying the air through the structure wherein the system includes a pair of independent refrigeration systems for cooling air moved by a ventilation system from the ambience to the inlet duct and further includes a heating system for heating the moving air.

Yet another object of the present invention is to provide a self-contained, self-propelled air-conditioning system for providing air to a structure having an inlet duct for conveying the air through the structure wherein the system includes a pair of independent refrigeration systems, each refrigeration system having a compressor for compressing a refrigerant and wherein the compressors are electrically connected in parallel to a generator powered by a prime mover of the air-conditioning system.

Another object of this invention is to provide a self-contained, self-propelled air-conditioning system for providing air to a structure having an inlet duct for conveying the air through the structure wherein the system includes an electrical control system having a plug adapted for connection to an external power supply for electrically connecting the air-conditioning system with the external power supply, the electrical control system also allowing a generator of the air-conditioning system to electrically energize equipment exterior of the air-conditioning system.

In carrying out the above objects and other objects of this invention, a preferred embodiment of the invention includes a frame mounted on rotatable wheels, a prime mover mounted on a frame for supplying mechanical energy and a generator mechanically connected to the prime mover for changing the supplied mechanical energy into electrical energy. The system further includes a ventilation system mounted on the frame and electrically connected to the generator for moving air from the ambience to an inlet duct of a structure. At least one refrigeration system mounted on the frame is electrically connected to the generator to cool the moving air.

The objects, features and advantages of the present invention are readily apparent from the following detailed description of the best mode taken in connection with the accompanying drawings.

BEST MODE FOR CARRYING OUT THE INVENTION

Figure 1:
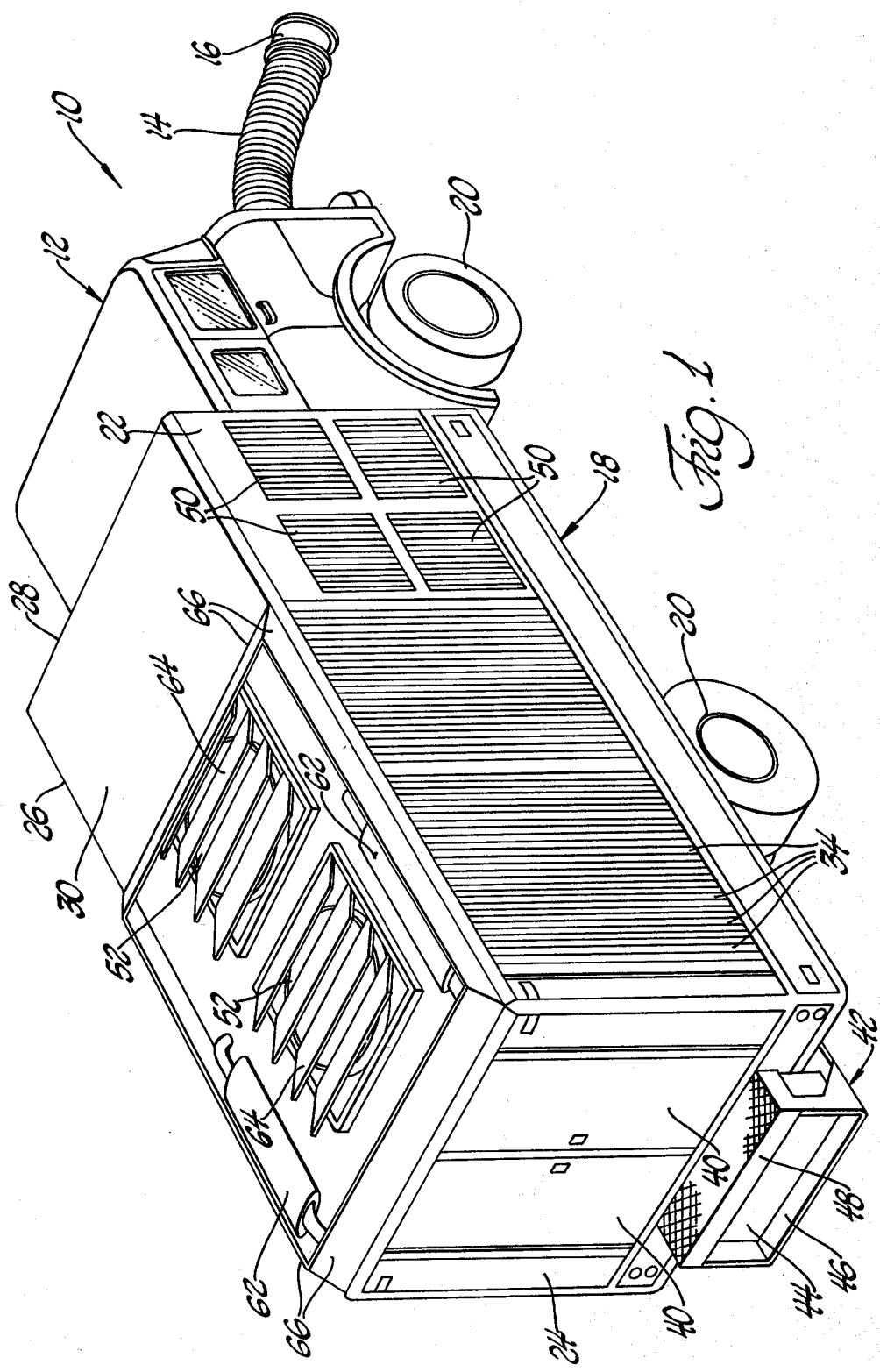
FIG. 1 is a perspective view which shown a self-contained, portable air-conditioning system constructed according to this invention.

Referring to FIG. 1, a self-contained, portable air-conditioning system or unit constructed according to the present invention is generally indicated at 10. The unit 10, which includes a suitable truck generally indicated at 12, may be parked adjacent a grounded aircraft (not shown) or other structure of the type having a conventional air inlet duct for conveying air through the structure. The unit 10 delivers air which is cooled or heated or air which is neither cooled nor heated to the inlet duct by means of an air outlet duct having an adapter 16 secured at its end thereof to thereby couple the air outlet duct 14 to the grounded aircraft or other structure to be serviced.

The unit 10 includes a frame or truck chassis generally indicated at 18 mounted on wheels 20 which are driven by a drive shaft of the truck 12 through the axles of the wheels 20 to thereby move the unit 10 to any desired position.

Figure 2:
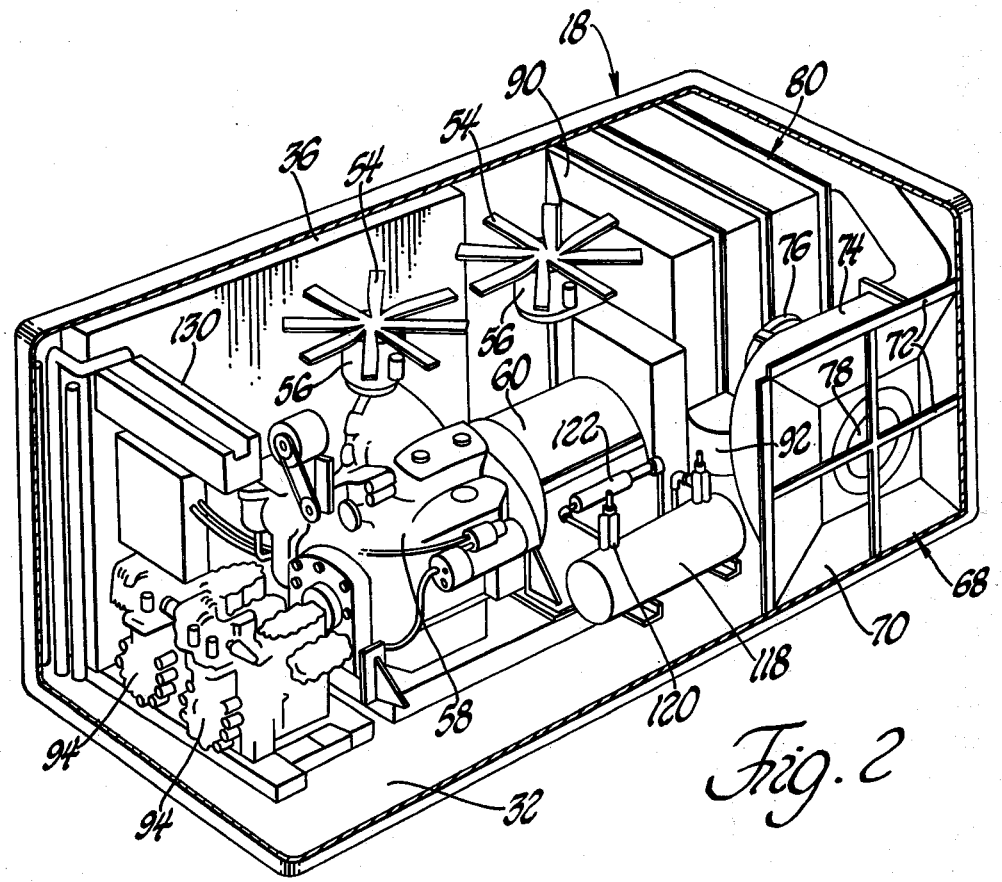
FIG. 2 is a partial perspective view, partially broken away, of the air-conditioning system of FIG. 1.

The frame 18 comprises a rectangular structure having side walls 22, 24, 26 and 28. The frame 18 also includes a top 30 and a bottom 32 as shown in FIGS. 1 and 2, respectively. The side wall 22 has a plurality of air inlets 34 extending therethrough. The air inlets 34 allow the passage of cooling air from the ambience into the interior of the frame 18 to cool a pair of condensers 36 one of which is shown in perspective in FIG. 2 and both of which are shown schematically in FIGS. 4 and 5. Air flowing through the air inlets 34 also cools a pair of radiators 38, not shown in FIG. 2 for the sake of simplicity, but which are shown schematically in FIG. 4.

The side wall 22 also includes four sets of ventilation air inlets 50 which allow air from the ambience to flow into a ventilation system of the air-conditioning system disposed interiorly the frame. Each of the inlets 50 includes a conventional air filter (not shown) which may comprise glass wool to filter the ambient air. The air filters comprise a portion of the ventilation system to be described in greater detail hereinafter.

The back side wall 24 of the frame 18 includes a pair of double doors 40 to allow easy access to all the components within the interior of the frame 18. A step structure generally indicated at 42 is mounted to the side wall 24 to allow an operator of the unit 10 easy access to the doors 40. A battery 44 is disposed between a pair of steps, 46 and 48, of the step structure 42 which battery 44 and its operation will be described in greater detail hereinafter.

The air which flows through the air inlets 34 and which passes over the condensers 36 and the radiators 38 is driven from the interior of the frame 18 by a pair of fans 54 as shown in FIG. 2 through a corresponding pair of air outlets 52 in the top 30 of the frame 18. The fans 54 are driven by their respective motors 56.

As shown in FIG. 2, a prime mover or a conventional diesel engine 58 is mounted to the bottom 52 of the frame 18 and supplies mechanical energy to a conventional generator 60 which is mechanically connected or flange-coupled to the diesel engine 58. The generator 60 changes the mechanical energy provided by the diesel engine 58 into electrical energy to energize the remainder of the unit 10 as will be described in greater detail hereinafter.

Disposed at the top 30 of the frame 18 and along the top edges of the side walls 22 and 26 are a pair of mufflers 63 connected to the exhaust ports (not shown) of the diesel engine 58 and which operate in a conventional fashion to muffle the noise emitted by the diesel engine 58. Also disposed at the top 30 of the frame 18 and immediately above the air outlets 52 are two sets of shutters 64 which are partially opened in the direction of the back side wall 24 to direct the noise generated by the different components of the unit 10 within the frame 18 away from the ground servicing personnel who, during the servicing operation of the grounded airplane, are typically positioned about the front end of the truck 12.

At the top 30 of the frame 18 are a set of sound-reducing baffles 66 three of which are disposed along the top edges of the side walls 22, 24 and 26 and one extending between the side walls 22 and 26 and spaced from the side walls 24 and 28. The baffles 66 enclose the mufflers 62 and the air outlets 52 to further protect the hearing of the ground support personnel by directing the noise coming from the interior of the frame 18 upwardly.

Figure 5:
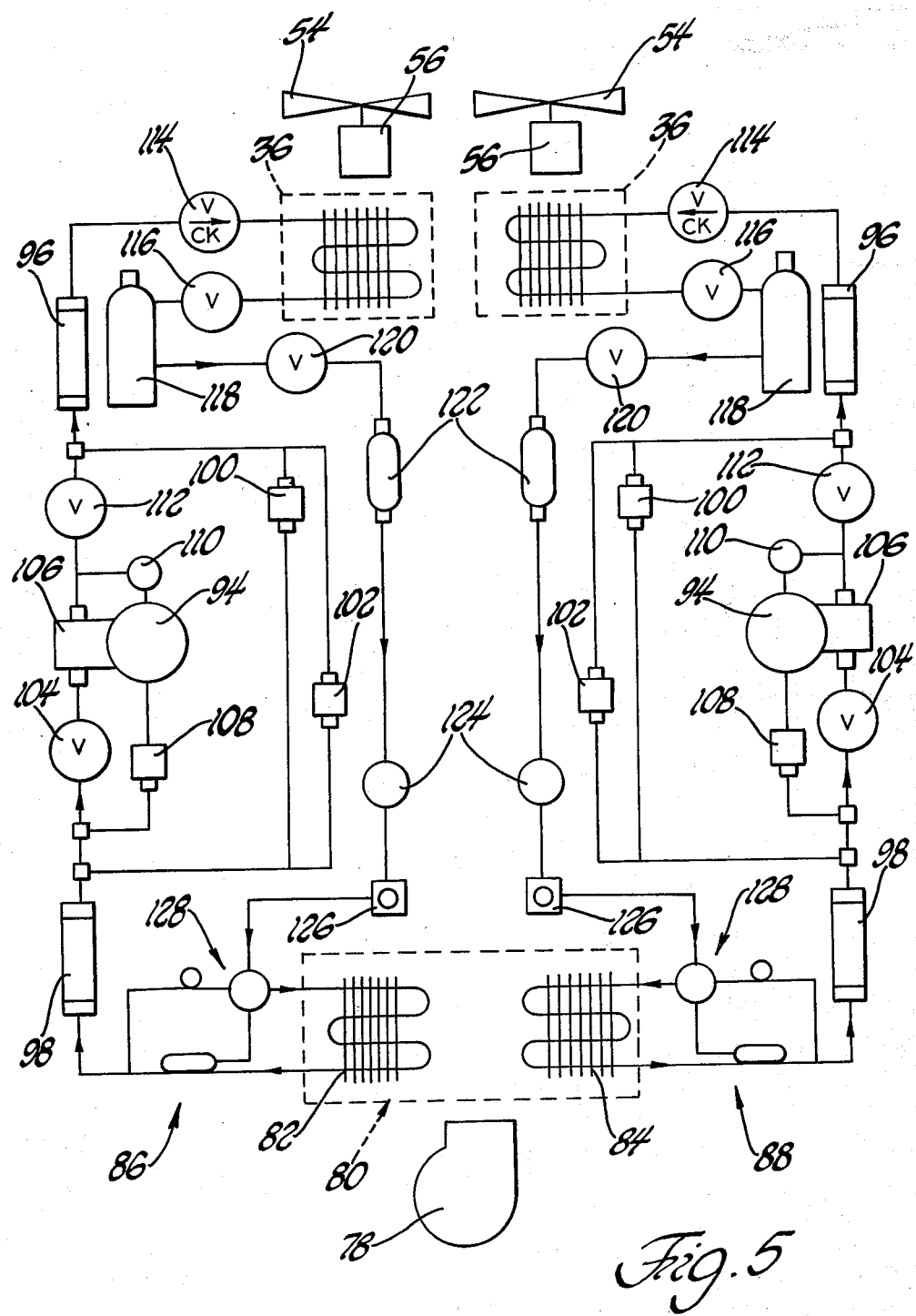
FIG. 5 is a schematic view showing the dual refrigeration systems of the air-conditioning system.

Referring now to FIG. 2, the ventilation system generally indicated at 68 of the unit 10 will now be described. The ventilation system 68 includes a horn-like element 70 fixedly secured to support beams 72 of the frame 18. The element 70 directs the filtered air flowing through the inlets 50 into a collection duct 74 when a blower motor 76 is energized to rotate a blower fan 78 thereby pulling air from the ambience into the duct 74. The duct 74 is in fluid communication with an evaporator generally indicated at 80 which includes a pair of evaporator coil assemblies 82 and 84 as shown in FIG. 5. The air provided by the blower 78 through the duct 74 may be cooled upon passing over the evaporator coil assemblies 82 and 84 of their respective refrigeration systems collectively indicated at 86 and 88, respectively, in FIG. 5 when the refrigeration systems 86 and 88 are selected to operate. The moving air passes over heating coils (not shown) of a heating system 90 which heating coils are selectively energized by the generator 60 to heat the moving air. In the event one of the refrigeration systems fails the other refrigeration system is adequate to cool the moving air.

The moving air, therefore, can be either cooled or heated or maintained at its original temperature. The ventilation system 68 includes an outlet duct 92 which is attached to and is in fluid communication with the flexible outlet duct 14 to supply the air to the inlet duct of, for example, a grounded aircraft.

As shown in FIGS. 2 and 5, each of the refrigeration systems 86 and 88 includes a compressor 94 which operate in a conventional fashion for compressing a refrigerant. As shown in FIG. 5, the refrigeration systems 86 and 88 are identical and therefore the description of one refrigeration system given hereinafter is sufficient to describe both of the refrigeration systems 86 and 88. Each of the dual refrigeration systems 86 and 88 includes a pair of vibration absorbers 96 and 98 to dampen the vibration caused by the reciprocating compressors 94 and which vibration might adversely affect the rest of the refrigeration systems 86 and 88. Operating in a conventional fashion with each compressor 94 are: a pair of pressure switches 100 and 102 connected in parallel with the compressor 94; a suction service valve 104 and an unloader valve 106 connected in parallel with the compressor 94; and, an oil pressure safety switch 108, a solenoid valve 110 and a discharge service valve 112, all operating in series with the compressor 94.

In a conventional fashion, the refrigerant flows from the compressor 94 through the vibration absorber 96, through a check valve 114 and into the coils of its corresponding condenser 36. As is well known in the art, the flow of air caused by the condenser fans 54 over the coils of the condenser 36 cools the refrigerant. Thereafter, the refrigerant flows through an inlet valve 116 and into a receiver where it is temporarily stored. The refrigerant exits the receiver 118 through an outlet valve 120 and is subsequently filtered and dried by a filter dryer 122. Thereafter the refrigerant flows through a solenoid valve 124, through a moisture indicator 126, through a conventional expansion valve generally indicated at 128 and through the evaporator 80 which cools the air passing over the evaporator 80 as moved by the blower 78. The flow cycle of the refrigerant is completed when the refrigerant passes through the second vibration absorber 98, through the valve 104 and the valve 106.

Figure 4:
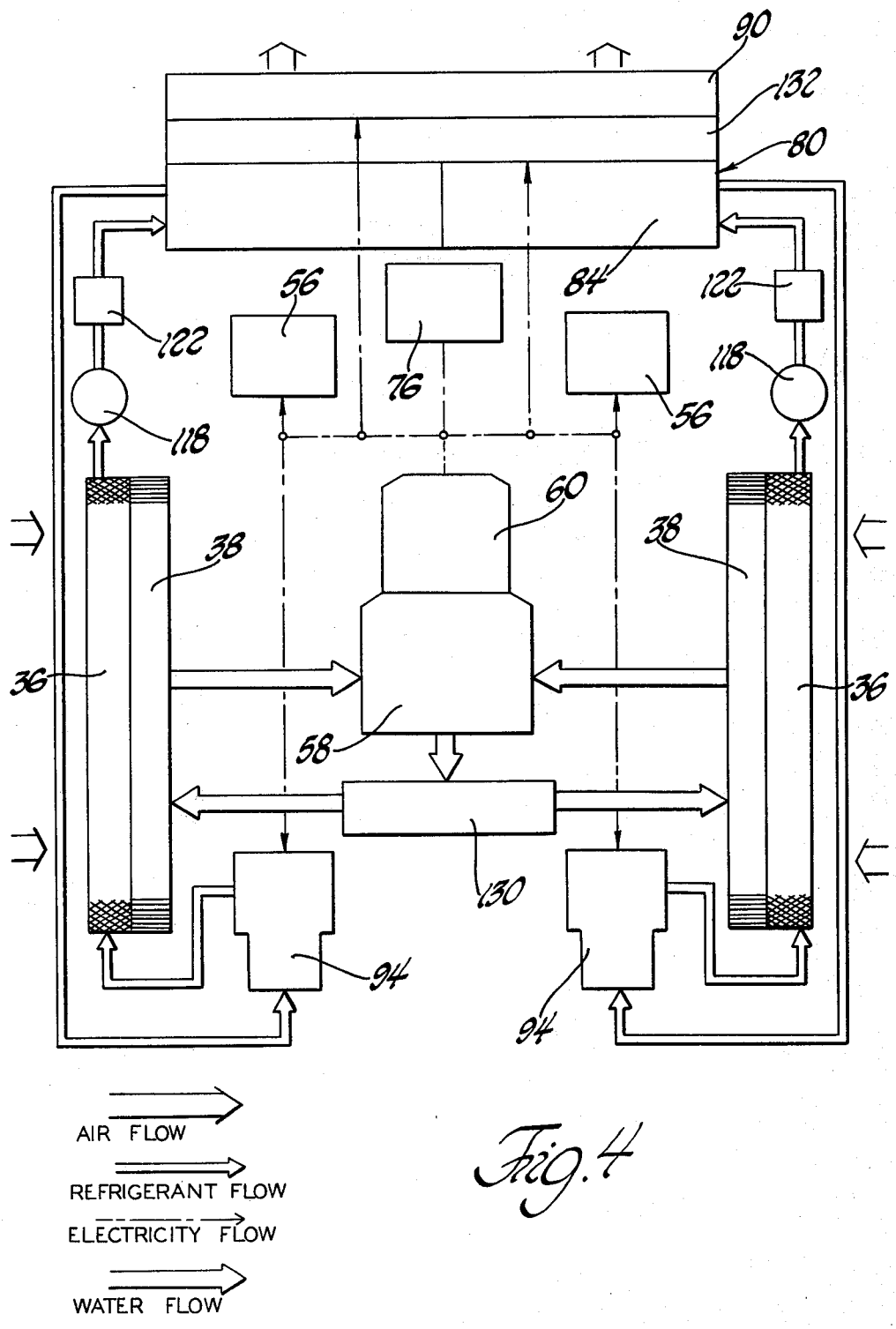
FIG. 4 is a schematic view showing the different flow paths between the different sub-systems of the air-conditioning system.

The diesel engine 58 is cooled in a conventional fashion as shown in FIG. 4 by water which flows from the diesel engine 58 into an expansion tank 130, wherein the accompanying water vapor is allowed to expand, to the radiators 38 and back into the diesel engine 58 after the heated water has been cooled at the radiators 38.

Also shown in FIG. 4 is a conventional water heater 132 which is energized by the generator 60 to heat the water contained therein. The water heater 132 provides a ready supply of hot water which can be used as desired.

Figure 6:
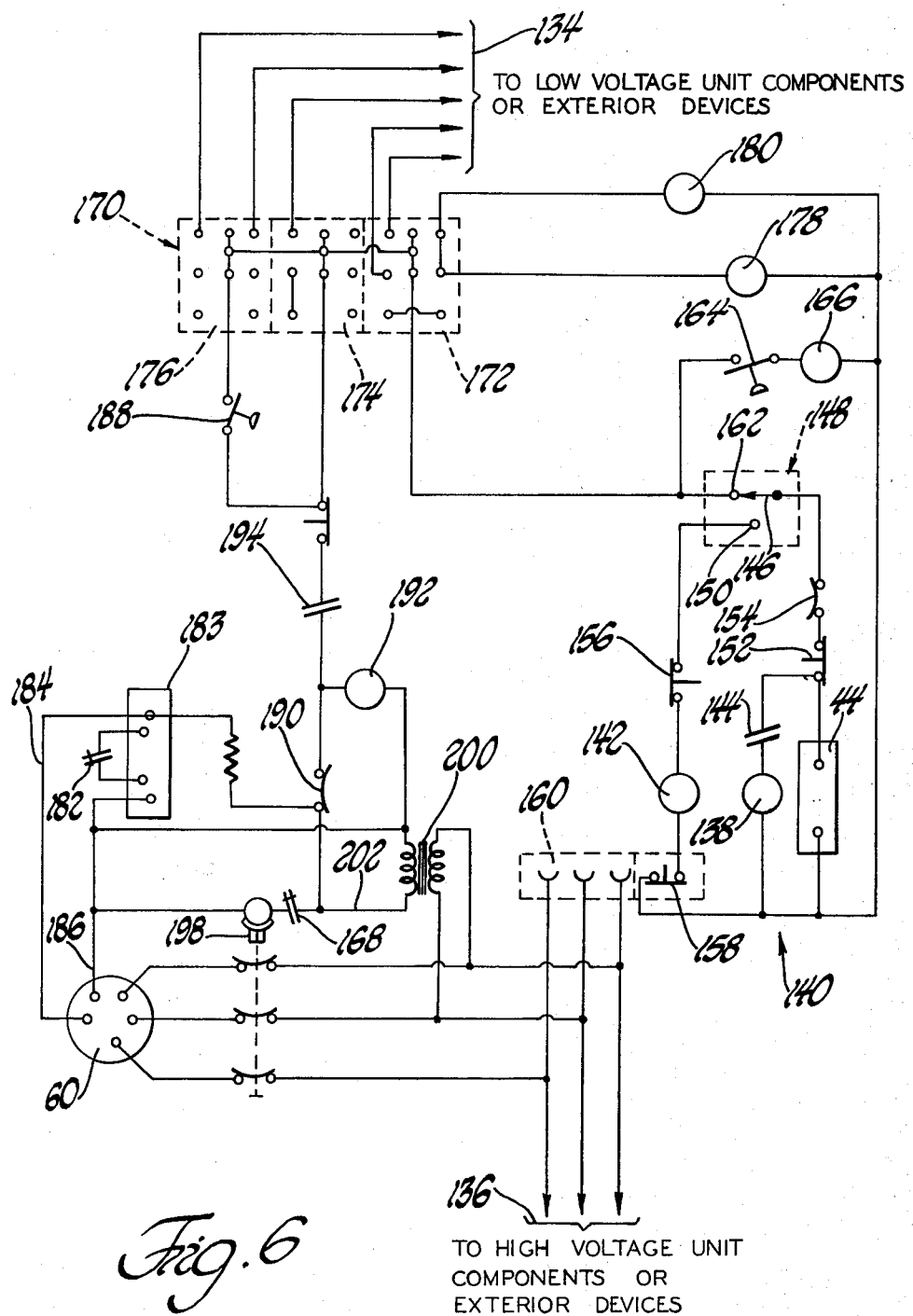
FIG. 6 is a schematic view showing electrical circuitry of the air-conditioning system.

The unit 10 also includes an electrical control system schematically shown in FIG. 6. The electrical control system electrically connects the generator 60 with the remainder of the unit 10 including the compressors 94, the condenser fan motors 56, the evaporator blower motor 76 the water heater 132 and the coils of the heating system 90. The generator 60 is electrically connected to the unit's components and to exterior equipment by low voltage conductors 134 and by high voltage conductors 136. The conductors, 134 and 136, allow the generator 60 to operate as a back-up generator to a variety of equipment.

The electrical control system includes a starter motor 138 for starting the diesel engine 58. The starter motor 138 forms part of a starting means or starting circuit, generally indicated at 140, which also includes the battery 44 also shown in FIG. 1. A solenoid 142 of the starting circuit 140 is energized to close a normally opened contact 144 when a switch blade 146 of a conventional blade switch 148 is held against a start contact 150. In this way the battery 44 energizes the starter motor 138 through the contact 144. The starting circuit 140 also includes a safety switch 152 associated with the double doors 40 which disables the starting circuit 140 when the double doors 40 are open. The starting circuit 140 also includes a circuit breaker 154 and a contact 156 which forms part of an engine emergency air damper switch (not shown). The starting circuit 140 further includes a normally closed switch 158 which opens mechanically to disable the starting circuit 140 when an electrical connector or plug (not shown) is inserted into a switching means or a plug 160 also shown in FIG. 3. The starting circuit 140 is also disabled when the switch blade 146 is released from the start contact 150 to engage a contact 162 of the switch 148.

After the engine 58 is started and the fuel pressure of the diesel engine 58 develops sufficiently enough to close a fuel pressure switch 164 a shunt relay coil 166 opens a normally closed contact 168 to thereby connect the generator 60 to the components of the unit 10.

Figure 3:
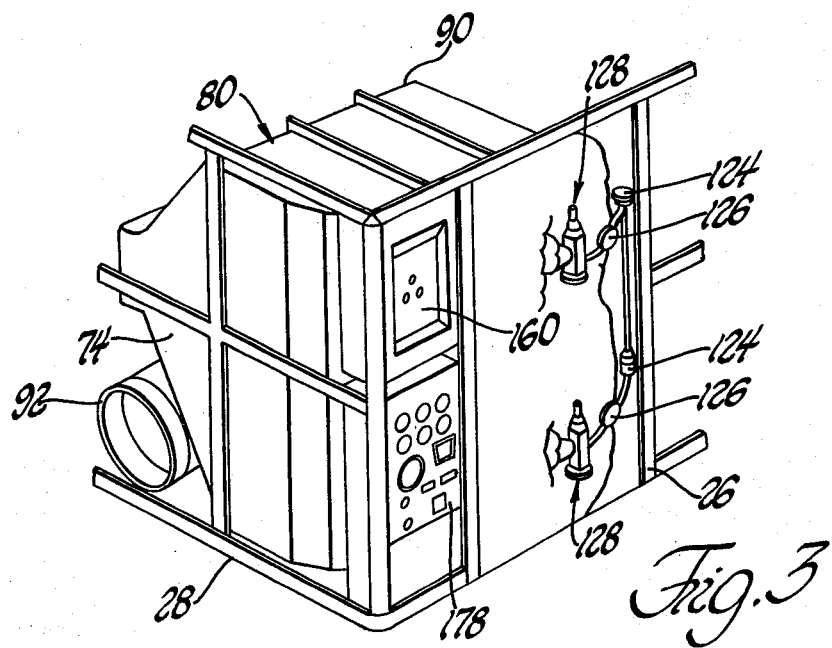
FIG. 3 is a partial perspective view, partially broken away, showing the hidden outer corner of the air-conditioning system of FIG. 2.

The electrical control system further includes a selector switch, generally indicated at 70, having three sets of gauged switch blades 172, 174 and 176 that can be positioned by an operator at an operator panel 178, as shown in FIG. 3, into seven possible positions including "power out", "part heat", "full heat", "off", "vent", "part cool", or "full cool". The first blade 172 provides power to an engine speed control solenoid 178 in any of the aforementioned positions to enable the diesel engine 58 to operate at 1,800 rpm. The first blade 172 also energizes an idle relay coil 180 which in turn opens a normally closed contact 182 of a switch 183 to activate the generator 60 through leads 184 and 186 electrically connected to the generator 60. A fuel pressure switch 188 similar to the fuel pressure switch 164 operates in the same fashion as the fuel pressure switch 164 to provide an electrical connection from the generator 60 to the switch 170 through a circuit breaker 190. A timer coil 192 closes its normally open contact 194 after a suitable time delay after the generator 60 is activated to provide a circuit from that generator 60 to the third and second switch blades 176 and 174, respectively.

The lead 186 carries power from the generator 60 to a trip coil 196 associated with a power circuit breaker 198. The normally closed contact 168 of the shunt relay 166 allows power to reach the trip coil 196 when a transformer 200 is energized by the generator 60 or by an external power supply along a pair of the conductors of the conductors 136 connected to the primary side of the transformer 200. Conversely, when the shunt relay coil 166 is energized while the diesel engine 158 is running, the normally closed contact 168 is now open to thereby deenergize the trip coil 196 disposed across the circuit breaker 198. In the event that the operator neglects to open the circuit breaker 198 manually after plugging the electrical connector or plug of the external power supply into the plug 160, the trip coil will become energized via a lead 202 from the transformer 200. The energized trip coil 196 opens the circuit breaker 198 such that no external power from the externally connected power supply can reach the generator 60 to damage it. The generator 60 is thereby protected when the diesel engine 58 is inoperative.

OPERATION

Typically, after the unit 10 has been parked in position and the adapter 16 has been connected to the inlet duct of a grounded aircraft, the operator holds the switch blade 146 against a start contact 150 to operate the starter motor 138 which, in turn, starts the diesel engine 58. The operator then selects the desired performance of the unit 10 by moving a selector switch 170 which allows the activation of the generator 60 which is mechanically driven by the diesel engine 58. The generator 60 supplies electrical energy along the electrical conductors 134 and 136 to the components of the unit 10 including the refrigeration systems 86 and 88 when chosen by the selector switch 170 on the operator panel 178. At the same time, the evaporator blower motor 76 and the condenser fan motors 56 are energized by the generator 60 to provide the necessary air flow from the inlets 50 to the duct 14, and past the condensers 36 and the radiators 38 from the inlets 34 and thereafter out the outlets 52. When the selector switch 170 is moved to a different position the moving air driven by the blower 78 can be heated by the coils of the heating system 90 or the moving air can merely be used for ventilation purposes without heating or cooling it.

The invention has been described in an illustrative manner, and it is to be understood that the terminology which has been used is intended to be in the nature of words of description rather than of limitation.

Many modifications and variations are possible in light of the above teachings. It is, therefore, to be understood that within the scope of the appended claims the invention may be practiced otherwise than as specifically described.

What is claimed is:

1. A self-contained, self-propelled air-conditioning apparatus for providing air to a structure having an inlet for conveying the air through the structure, said system comprising:

a frame mounted on rotatable wheels, driving means for rotating said wheels,
a prime mover mounted on said frame for supplying mechanical energy,
starting means for starting said prime mover,
a generator mechanically connected to said prime mover for changing the supplied mechanical energy into electrical energy,
a ventilation system mounted on said frame for moving air from the ambience to the inlet duct,
two refrigeration systems mounted on said frame, each selectively operable alone or with the other for cooling said moving air, and
an electrical control circuit for selectively electrically connecting each of said ventilation, and refrigeration systems to said generator and for selectively electrically connecting each of said ventilation, and refrigeration systems to an external electrical power source, said control circuit including means for automatically breaking the electrical connection to the generator and for disabling said starting means when there is electrical connection to the external electrical power source.

2. Apparatus as set forth in claim 1 wherein said electrical control circuit further includes switch means for electrically connecting said generator to supply electrical power therefrom for energizing systems external of said apparatus.

3. Apparatus as set forth in claim 1 further including a heating system selectively connectable by said electrical control circuit to said generator and to said external electrical power source.

* * * * *